(12) United States Patent
Wagner et al.

(10) Patent No.: US 9,541,449 B2
(45) Date of Patent: Jan. 10, 2017

(54) METHOD FOR CORRECTING FOR DARK CURRENT VARIATION IN TEC COOLED PHOTODIODES

(71) Applicant: JDS Uniphase Corporation, Milpitas, CA (US)

(72) Inventors: Chris Wagner, Ottawa (CA); James Kirby Goulet, Richmond (CA)

(73) Assignee: VIAVI SOLUTIONS INC., Milpitas, CA (US)

(*) Notice: Subject to any disclaimer, the term of this patent is extended or adjusted under 35 U.S.C. 154(b) by 320 days.

(21) Appl. No.: 14/186,549

(22) Filed: Feb. 21, 2014

(65) Prior Publication Data

US 2014/0240698 A1    Aug. 28, 2014

Related U.S. Application Data

(60) Provisional application No. 61/767,991, filed on Feb. 22, 2013.

(51) Int. Cl.
*G01J 1/42* (2006.01)
*G01J 1/44* (2006.01)
*G01J 1/02* (2006.01)

(52) U.S. Cl.
CPC ............ *G01J 1/4257* (2013.01); *G01J 1/0228* (2013.01); *G01J 1/0252* (2013.01); *G01J 1/44* (2013.01)

(58) Field of Classification Search
CPC ...... G01J 1/0228; G01J 1/0252; G01J 1/4257; G01J 1/44; G01J 2001/444; H04N 5/357; H04N 5/361
See application file for complete search history.

(56) References Cited

U.S. PATENT DOCUMENTS

| | | | | |
|---|---|---|---|---|
| 6,629,638 | B1* | 10/2003 | Sanchez | G01R 31/002 235/454 |
| 8,687,110 | B1* | 4/2014 | Gardner | H04N 5/23241 250/352 |
| 2003/0165009 | A1 | 9/2003 | Olivier | 359/341.41 |
| 2005/0184221 | A1 | 8/2005 | Chien et al. | 250/214 R |
| 2009/0080903 | A1* | 3/2009 | Moriyasu | H04B 10/572 398/182 |

* cited by examiner

*Primary Examiner* — Kara E Geisel
*Assistant Examiner* — Dominic J Bologna
(74) *Attorney, Agent, or Firm* — Mannava & Kang, P.C.

(57) ABSTRACT

An optical power meter including a photodiode having a surface for receiving a beam of light, a thermo-electric cooler for maintaining the photodiode at a predetermined temperature, and a current monitor for measuring a drive current passing through the thermo-electric cooler allows dark current drift arising from a varying thermal gradient across the active region of the photodiode to be corrected, thus improving stability of the optical power meter. More specifically, by monitoring the TEC drive current, and applying a correction factor to the optical power readings, the stability of optical power readings is improved by an order of magnitude.

16 Claims, 5 Drawing Sheets

METHOD FOR CORRECTING FOR DARK CURRENT VARIATION IN TEC COOLED PHOTODIODES

CROSS-REFERENCE TO RELATED APPLICATIONS

The present invention claims priority from U.S. Provisional Patent Application No. 61/767,991 filed Feb. 22, 2013, the entirety of which is incorporated herein by reference.

TECHNICAL FIELD

The present invention relates generally to TEC cooled photodiodes, and more particularly to a method and apparatus for correcting for dark current variation in TEC cooled photodiodes.

BACKGROUND OF THE INVENTION

A photodiode is a type of photodetector capable of converting light into either current or voltage, depending on the mode of operation. More specifically, a photodiode is a photosensitive semiconductor diode typically having either a p-n junction or a PIN structure. When a photon having sufficient energy is incident on the photodiode it is absorbed and an electron-hole pair is generated. When an electric field is applied across the photodiode, the electron-hole pairs are swept away, thus inducing a photocurrent.

Most photodiodes are designed to be used in either the photoconductive mode (reverse biased) or the photovoltaic mode (no bias). In the photovoltaic mode, the flow of photocurrent out of the device is restricted and a voltage builds up. A current flows when the device is loaded. In the photoconductive mode, the drift of carriers induces a reverse current dependent on the incident optical power, which is delivered to an outer circuit.

In general, the total current passing through the photodiode is the sum of the photocurrent (i.e., the electrical current that flows through the photodiode as a result of the exposure to the photons having sufficient energy) and the dark current (i.e., the electrical current that flows through the photodiode even when it is not exposed to the photons having sufficient energy). In fact, dark current, which is a property of all photodiodes and is due to the random generation of electrons and holes within the depletion region of the photodiode, is one of the main sources of noise in devices using photodiodes. Accordingly, it is advantageous to minimize dark current in order to maximize the sensitivity of these devices.

In general, dark current is primarily a function of the semiconductor material, the size (e.g., active area) of the photodiode, the temperature of the photodiode, and the bias voltage across the photodiode. For example, dark current typically increases with increases in temperature. Accordingly, one method of reducing dark current in devices having photodiodes is to cool the photodiode. For example, some high sensitivity optical power meters, with sensitivities below −80 dBm, mount a thermo-electric cooler (TEC) directly under the photodiode substrate in order to stabilize the dark current present in the photodiode.

FIG. 1 illustrates one embodiment of an optical power meter (OPM) having a TEC cooled photodiode. The OPM, which is a device commonly used to measure the power in an optical signal in a fiber optic system, includes the TEC cooled photodiode 110, an amplifier 120, an analog-to-digital converter (ADC) 130, a controller 140, and a display 180. The photodiode 110 is formed of a semiconductor material selected for the particular application. For example, semiconductor materials such as silicon (Si), Germanium (Ge), and/or Indium-Gallium-Arsenide (InGaAs) are commonly used in OPMs since they are sensitive to light at the wavelengths and power levels common to fiber optics. When the photodiode 110 is exposed to light at the appropriate wavelength, a photocurrent is generated, which is dependent on the power of the incident light. The total current passing through the photodiode, including the photocurrent, is amplified by and converted to a voltage by the amplifier 120. The resultant voltage is converted to a digital signal by the analog-to-digital converter (ADC) 130. The controller 140 processes the digital signal to generate a result (e.g., an optical power reading) and sends the result to the display 180. Notably, although dark current is significantly reduced by TEC cooling, it is still present. Accordingly, an initial dark current measurement wherein the optical input to the OPM is blocked is typically obtained and stored. The controller 140 then uses this initial dark current reading to calculate more accurate readings for subsequent optical power measurements (e.g., subsequent power measurements are computed after subtracting the initial dark current from the total photodiode current).

SUMMARY OF THE INVENTION

The use of a thermo-electric cooler (TEC) to cool a photodiode leads to a thermal gradient across the active region of the photodiode. This thermal gradient induces an electric current through the Seebeck effect, which affects dark current measurements. More specifically, variations in environmental conditions result in changes to the TEC drive current, and thus changes in the thermal gradient and in the dark current (i.e., the dark current drifts with time even when the operating temperature is maintained with high precision). When optical power measurements are calculated using the initial dark current reading only, these dark current drifts will result in significant errors in low power optical measurements. The longer the time between the initial dark current reading and subsequent optical power reading, the larger the errors. The result is poor long term stability at low input powers. By monitoring the TEC drive current, and applying a correction factor to the optical power readings, the stability of optical power measurements is improved by an order of magnitude.

According to one aspect of the present invention there is provided an apparatus comprising: a photodiode having a surface for receiving a beam of light, the photodiode for generating a current dependent upon an optical power of the beam of light; a thermo-electric cooler for maintaining the photodiode at a predetermined temperature; a current monitor for measuring a drive current passing through the thermo-electric cooler; and a controller for calculating the optical power of the beam of light, the controller including a non-transitory storage medium having instructions stored thereon for determining a correction factor in dependence upon at least one current measured with the current monitor, the correction factor for calculating the optical power of the beam of light.

According to one aspect of the present invention there is provided an optical power meter comprising: a photodiode for measuring an optical power of a beam of light, the photodiode having an initial dark current; a thermo-electric cooler (TEC) for maintaining the photodiode at a predetermined temperature, the TEC having an initial drive current;

a current meter for measuring a current drive current for the TEC; and a controller for calculating a corrected optical power reading based on the initial dark current and a difference between the initial drive current and the current drive current.

According to another aspect of the present invention there is provided a method of determining an optical power of a beam of light with a thermo-electric cooled photodiode, comprising: a) measuring a dark current of the photodiode and a first drive current of the thermo-electric cooler; b) measuring a current of the photodiode when the beam of light is incident thereon and a second drive current of the thermo-electric cooler; c) calculating the optical power of the beam of light using the current of the photodiode and a correction factor, the correction factor determined in dependence upon the second drive current.

According to another aspect of the present invention there is provided a method of determining an optical power measurement using an optical power meter including a photodiode with a thermo-electric cooler (TEC) comprising: a) determining an initial dark current measurement of the photodiode, and an initial drive current of the TEC; b) measuring a power measurement of an optical beam; c) measuring a current drive current of the TEC; and d) calculating a corrected optical power measurement based on the initial dark current and on a difference between the initial drive current and the current drive current of the TEC.

BRIEF DESCRIPTION OF THE DRAWINGS

The invention will be described in greater detail with reference to the accompanying drawings, in which.

It will be noted that throughout the appended drawings, like features are identified by like reference numerals.

DETAILED DESCRIPTION

Figure 1:
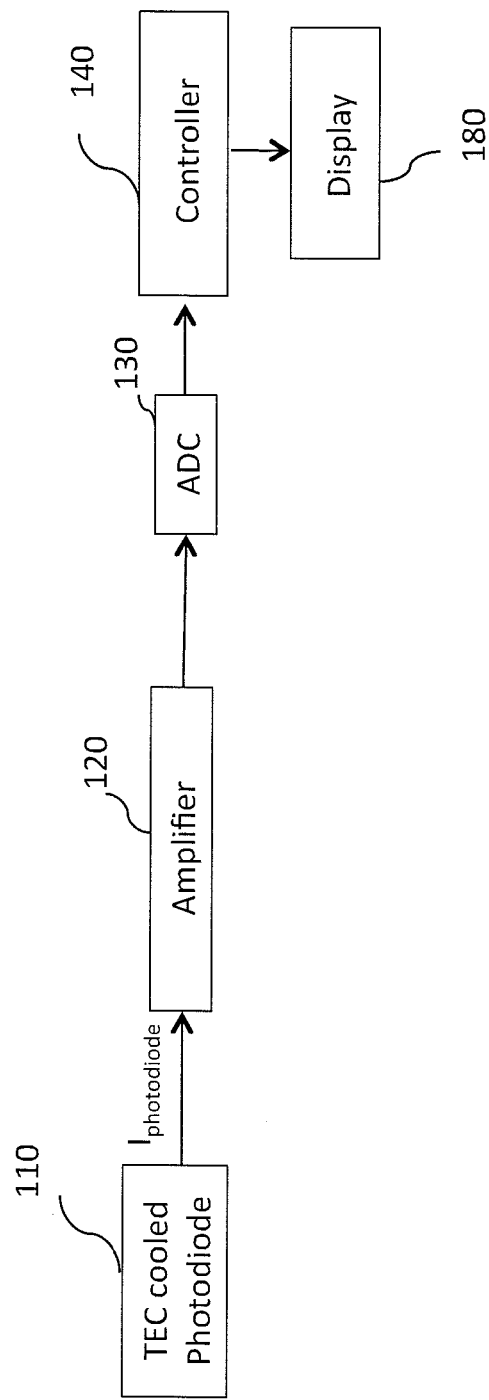
FIG. 1 is a block diagram of a prior art optical power meter having a TEC cooled photodiode.
Figure 2:
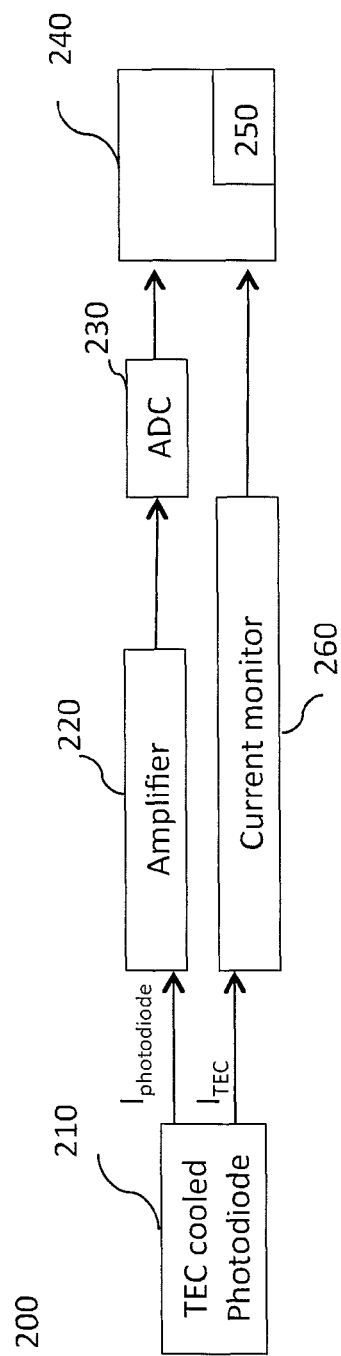
FIG. 2 is a block diagram of an apparatus having a TEC cooled photodiode in accordance with one embodiment of the instant invention.

FIG. 2 is a block diagram of an apparatus in accordance with one embodiment of the instant invention. The apparatus is a device 200 that includes a thermo-electric cooler (TEC) cooled photodiode 210. The total current passing through the photodiode (i.e., $I_{photodiode}$) is amplified by and converted to a voltage using an amplifier 220. The resulting voltage is converted to a digital signal by the analog-to-digital converter (ADC) 230. The controller 240 processes the digital signal to generate a result (e.g., an optical power reading) and optionally sends the result to a display (not shown). The current monitor 260 monitors the TEC drive current, which is used to run the photodiode at a predetermined temperature.

The TEC cooled photodiode 210 includes semiconductor diode selected in dependence upon the intended wavelength range and power levels. For example, semiconductor materials such as silicon (Si), Germanium (Ge), and Indium-Gallium-Arsenide (InGaAs) are sensitive to light at the wavelengths and power levels commonly found in fiber optic communication systems. The photodiode has a surface for receiving a beam of light having an optical power. When the light-receiving surface is exposed to light in a particular wavelength range, an electric current is generated within the photodiode. This photocurrent is dependent on the optical power of the incident light and to the responsivity of the photodiode to the wavelength of the incident light beam. The total current passing through the photodiode (i.e., $I_{photodiode}$), which includes the photocurrent and the dark current, is fed into the amplifier 220.

The amplifier 220 converts the photodiode current (i.e., $I_{photodiode}$) into a voltage. In general, the amplifier 220 will be a linear amplifier wherein the voltage is proportional to the input current. For example, in one embodiment the amplifier is a transimpedance amplifier (TIA). The exact configuration of the transimpedance amplifier typically is selected in dependence upon the particular application.

The analog-to-digital converter (ADC) 230 digitizes the voltage output from the amplifier 220. More specifically, the ADC 230 converts the input voltage to a digital number proportional to the magnitude of the voltage. For example, in one embodiment the output of the ADC 230 is the number of ADC counts corresponding to the current measurement (e.g., $I_{photodiode}$).

The controller 240 includes a processor for providing digital signal processing (DSP). For example, in one embodiment the controller 240 includes a high-speed processor that provides DSP including the conversion of the current measurements to optical power measurements. Some examples of DSP that the controller 240 provides include real-time calibration, corrections, linearizations, and/or referencing. In one embodiment, the processor also formats the resulting data for a display (not shown), to be stored in memory 250, and/or for transfer to another device (e.g., over the internet or to a USB flash). In general, the processor accepts digital data as input, processes it according to the computer code stored in its memory, and provides the results as output. The memory 250, which typically includes some form of non-volatile memory, will either be part of the processor or will be separate from the processor. For example, in one embodiment the memory 250 is non-transitory memory (e.g., a non-transitory computer readable storage medium) that is integrated with the processor and that stores instructions (e.g., computer code) for performing the DSP. In general, the memory 250 will store calibration and/or correction data used to calculate the optical power measurements. For example, in one embodiment, the memory 250 stores an initial and/or most recently measured dark current reading.

As discussed above, the photodiode is cooled with a thermo-electric cooler (TEC) in order to minimize dark current. A TEC is a device wherein current flow through the device heats one side of the device, while cooling the other side of the device. The hot side of the TEC is typically attached to a heat sink so that it remains at ambient temperature. In TEC cooled photodiodes, the TEC typically cools the photodiode so that the photodiode is run at a predetermined temperature (e.g., at a fixed operating temperature). Since lower photodiode temperatures usually result in a lower dark current, the operating temperature of the photodiode should be as low as possible, however, in practice, this temperature must be must be achievable by the TEC at the maximum ambient operating temperature, and should not be so low as to result in condensation/frost on the surface of the photodiode at the maximum relative humidity level. For example, many commercially available devices having TEC cooled photodiodes run the photodiodes at temperatures between −10° C. and −20° C. In general, temperature control is achieved by adjusting the current input into the TEC (i.e., the TEC drive current). For example, in one embodiment the TEC drive current is adjusted in dependence upon feedback from a temperature sensor and a temperature regulation circuit, packaged with the photodiode, thus allowing the temperature of the photodiode to adapt to environmental changes and be stabilized quickly.

Figure 3:
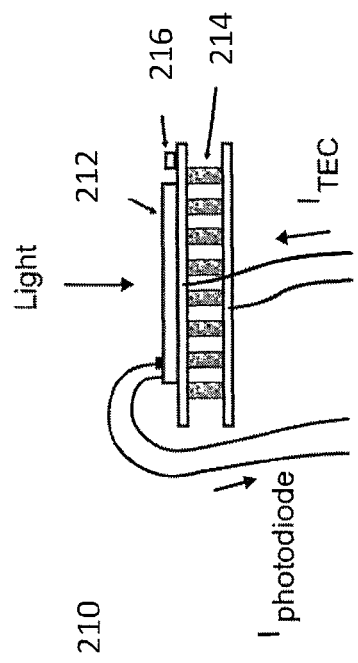
FIG. 3 is a cross-sectional view of one embodiment of TEC cooled photodiode.

Referring to FIG. 3, there is shown a cross section of one embodiment of the TEC cooled photodiode illustrated in FIG. 2. In this embodiment, the TEC cooled photodiode 210 is a TEC cooled photodetector wherein the photodiode 212, TEC 214, and temperature sensor 216 are arranged in a single package. The TEC is mounted directly under the photodiode substrate, whereas the temperature sensor is mounted on the photodiode substrate.

Figure 4:
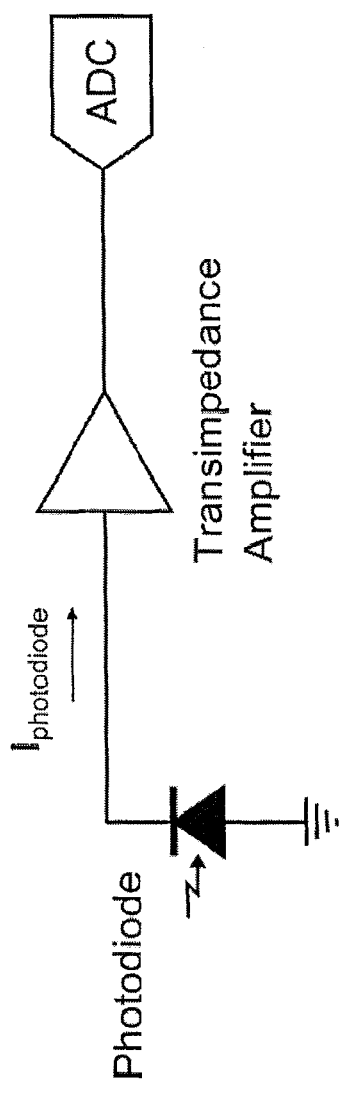
FIG. 4 is a circuit diagram showing the photodiode current analog-to-digital conversion.

The current fed out of the photodiode (i.e., $I_{photodiode}$) includes both the photocurrent induced by light incident on the photodiode and the dark current. The dark current, which is the electrical current flowing through the photodiode even in the absence of light, is a property of all photodiodes and is primarily a function of the material composition, the size (i.e., active area) of the photodiode, the temperature of the photodiode, and the bias voltage across the photodiode. In general, the electronics are designed to minimize the voltage across the photodiode. FIG. 4 is a circuit diagram illustrating the photodiode current analog-to-digital conversion in accordance with one embodiment of the instant invention. More specifically, FIG. 4 shows that the electric current flowing through the TEC cooled photodiode ($I_{photodiode}$) is amplified by and converted to a voltage using the linear amplifier 220, and that the resultant voltage is converted to a digital signal by the ADC 230.

The current fed into to the TEC (i.e., $I_{TEC}$) is used to cool the active region of the photodiode 212, and thus reduce dark current. In general, the current fed into the TEC (i.e., $I_{TEC}$) is adjusted to maintain the photodiode 212 at a predetermined operating temperature. Notably, the use of the TEC 214 leads to a thermal gradient across the active region of the photodiode 212, which induces an electric current through the Seebeck effect. This current, although small, is typically sufficiently large enough to affect dark current readings. Moreover, environmental fluctuations (e.g., very small temperature changes) result in changes to the TEC drive current (i.e., $I_{TEC}$), and thus to the temperature induced gradient current. Accordingly, the dark current appears to drift with time (i.e., drifts with respect to an initial dark current measurement). The more time that passes from when the initial dark current was measured and when the optical power readings are taken, the more likely the dark current will change, and the less accurate low magnitude optical power measurements calculated only with the initial dark current measurement will be.

Figure 5:
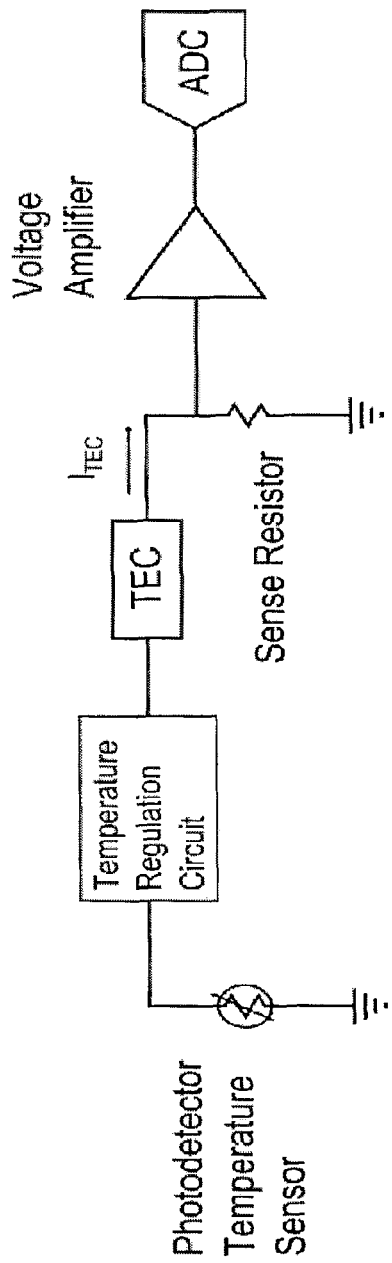
FIG. 5 is a circuit diagram showing the TEC drive current analog-to-digital conversion.

The current monitor 260 monitors the TEC drive current (e.g., the current passed through the TEC). The TEC drive current, is used to compensate for the variations in the dark current readings caused by the Seebeck effect (i.e., and thus provide more accurate low magnitude optical power measurements). In one embodiment, the current monitor 260 includes a current sensor (e.g., a resistor positioned in the current path that generates a voltage proportional to the current that is being measured), a voltage amplifier that measures the voltage across the current sensor (e.g., a differential amplifier such as a shunt monitor or linear operational amplifier), and an ADC that provides a digital current measurement. For example, in one embodiment the current monitor 260 includes a sense resistor, a linear amplifier, and an ADC, as illustrated in FIG. 5. Notably, in this embodiment, the TEC drive current is adjusted using a temperature regulation circuit in dependence upon feedback from the temperature sensor coupled to the photodiode 210. Notably, while embodiments wherein the current monitor 260 monitors the TEC drive current by measuring the voltage across a known resistance are relatively accurate, simple, and cost effective, in other embodiments, the current monitor 260 measures the voltage across the TEC (e.g., since the TEC has a resistance, the voltage across the TEC will be a function of the current through the TEC) or includes a Hall Effect sensor.

In general, the TEC drive current is used to compensate for the variations in the dark current readings caused by the Seebeck effect using a predetermined relationship between dark current and TEC drive current. This predetermined relationship, which results from the fact that the electric current induced through the Seebeck effect is proportional to the temperature gradient, and thus related to the TEC drive current, is typically determined prior to obtaining the optical power measurements and is stored in memory 250. For example, in one embodiment the relationship between TEC drive current and dark current is determined during the factory calibration of the device. In another embodiment, the relationship between TEC drive current and dark current is determined in an operator initiated process. In embodiments requiring high precision, the relationship typically is determined for each device. In embodiments requiring less precision, the relationship typically is determined for each model of the device.

In one embodiment, the relationship is determined by simultaneously measuring the dark current and TEC drive current for the device at several different temperatures within the expected operating temperature range of the photodiode (e.g., during the factory calibration of the device). In one embodiment, the relationship is stored as a table of dark current and TEC drive current values (e.g., dark current and TEC drive current ADC counts). In another embodiment, the relationship is stored as an equation and/or as coefficients. For example, in one embodiment, the dark current ADC counts measured at a plurality of different temperatures are plotted versus the corresponding TEC ADC counts, and the relationship between dark current and TEC drive current is provided by coefficients resulting from the best polynomial fit of the plot.

Once the predetermined relationship between dark current and TEC drive current is determined, this relationship is used with the TEC drive current readings taken about the same time as the optical power readings (e.g., current drive current readings) to compensate for variations in the dark current (i.e., dark current drift). Improved compensation is achieved when the TEC drive current readings are obtained concurrently with the optical power/dark current readings.

In one embodiment, the predetermined relationship between TEC drive current and photodiode dark current is used to estimate the corrected dark current directly. For example, in one embodiment the TEC drive current measured concurrently with an optical power reading is used to calculate the corrected dark current reading using the relationship (e.g., look up table or using the equation) stored in memory. This corrected dark current reading is subtracted from the optical power reading to provide a relatively accurate optical power measurement.

In another embodiment, the predetermined relationship between TEC drive current and photodiode dark current is used estimate the dark current drift by comparing the TEC drive current reading measured with an initial dark current reading and the TEC drive current measured with a subsequently measured optical power reading (i.e., using the difference between the TEC drive current readings).

For example, if a first photodiode reading (i.e., corresponding to the dark current) is obtained concurrently with a first TEC drive current reading at a first time, and a second photodiode reading (i.e., corresponding to the optical power reading) is obtained concurrently with a second TEC drive current reading at a second other time, then the difference between the first and second TEC drive current readings will be related to the dark current drift that occurred between the first and second time points.

By applying a correction factor to the first photodiode reading (i.e., corresponding to the dark current), wherein the correction factor is determined in dependence upon the difference between the first and second TEC drive currents and the predetermined relationship, a more accurate estimation of the current dark current is obtained. More specifically, a dark current value that has been corrected for dark current drift is provided. This corrected dark current value is then subtracted from the optical power reading to provide a more accurate dark current corrected optical power reading. Notably, dark current corrections are typically performed using dark current values rather than the optical power values since the conversion factor from current to optical power depends on the wavelength of light.

Advantageously, since the current monitor 260 allows the TEC drive current to be monitored continuously and monitored simultaneously with optical power readings, real-time corrected dark current values and/or correction factors are obtained. In other words, the instability resulting from obtaining taking the dark current reading and optical power reading at different times (e.g., in tandem) is obviated.

Referring again to FIGS. 4 and 5, the device 200 operates as follows (i.e., in one embodiment). Light incident on the photodiode 212 is converted to an electric current. The total current passing through the photodiode 212 ($I_{photodiode}$), which includes the photocurrent, the dark current, and the temperature gradient induced current, is amplified by and converted to a voltage by the transimpedance amplifier 220. The resultant voltage is converted to a digital signal corresponding to the photodiode current ($I_{photodiode}$) by the ADC 230 (e.g., photodiode current ADC counts).

At approximately the same time (e.g., there is at least some overlap) as this optical power reading is obtained, a TEC drive current reading is also obtained. This TEC drive current reading is used to provided an optical power measurement wherein the optical power has been corrected for dark current including the Seebeck induced current variations. In one embodiment, the TEC drive current reading is used to determine a correction factor that is applied directly to the optical power measurement (e.g., the optical power value obtained by subtracting the initial dark current from the photodiode current, is adjusted by an amount calculated using one or more TEC drive current readings). In another embodiment, the TEC drive current reading is used to determine a corrected dark current reading, which is subsequently subtracted from the total photodiode current. For example, in one embodiment the corrected dark current is calculated using one or more TEC drive current readings and the coefficients determined by the best fit polynomial of a plot of previously measured dark current ADC counts and TEC drive current ADC counts.

Figure 6:
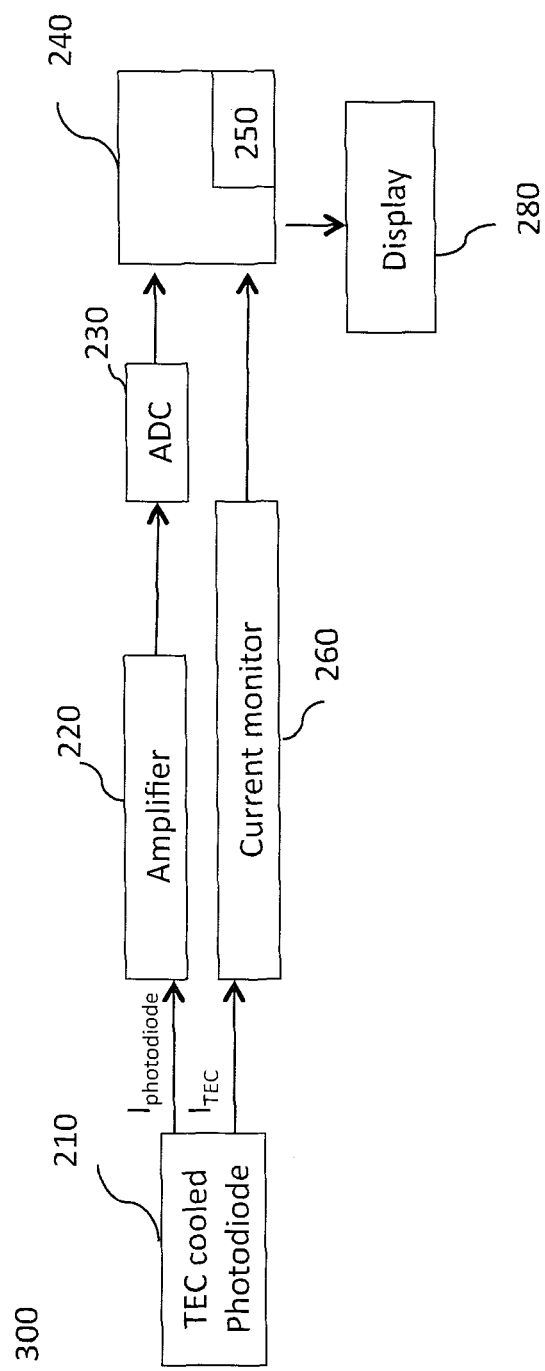
FIG. 6 is a block diagram of an optical power meter having a TEC cooled photodiode in accordance with one embodiment of the instant invention.

In accordance with one embodiment of the instant invention, the TEC cooled photodiode 210, amplifier 220, ADC 230, controller 240, and current monitor 260 are part of an optical power meter 300, as illustrated in FIG. 6. In this embodiment, the photodiode is an InGaAs photodiode with a 3 mm active area, which is run at −10° C. using the TEC. The electronics are designed to minimize the voltage across the photodiode and at the same time convert $I_{photodiode}$ to a voltage at the amplifier 220 output. In this example, a linear transimpedance amplifier with a gain of 2 gigaohms converts $I_{photodiode}$ to a voltage which is then digitized by an 18-bit ADC. The current monitor 260 monitors the TEC drive current and the controller 240 calculates optical power measurements by applying a correction factor (e.g., determined using at least one TEC drive current) to the optical power readings. In one embodiment, the optical power meter is a high sensitivity optical power meter (i.e., with a sensitivity below −80 dBm).

In operation, an operator obtains an initial dark current reading (e.g., wherein the optical input is blocked). For example, operators often obtain an initial dark current reading at the beginning of a work day. This initial dark current reading ($I_{darkcurrent0}$) includes the baseline dark current ($I_{darkcurrent}$) and the current induced by the Seebeck effect ($I_{Seebeck0}$).

$$I_{darkcurrent0} = I_{darkcurrent} + I_{Seebeck0} \quad \text{Eq. 1}$$

As the initial dark current reading is obtained, an initial TEC drive current reading ($I_{TEC0}$) is also measured. After the initial dark current reading has been obtained, the optical power meter is used to obtain one or more optical power measurements (e.g., throughout the work day). Each optical power reading will also have a corresponding TEC drive current reading.

For example, a first optical power reading will include the photocurrent induced by an incident beam of light ($I_{photocurrent1}$), the baseline dark current ($I_{darkcurrent}$), and the current induced by the Seebeck effect ($I_{Seebeck1}$), whereas a second optical power reading will include the photocurrent induced by another beam of light ($I_{photocurrent2}$), the baseline dark current ($I_{darkcurrent}$), and the current induced by the Seebeck effect ($I_{Seebeck2}$).

$$I_{photodiode1} = I_{photocurrent1} + I_{darkcurrent} + I_{Seebeck1} \quad \text{Eq. 2}$$

$$I_{photodiode2} = I_{photocurrent2} + I_{darkcurrent} + I_{Seebeck2} \quad \text{Eq. 3}$$

A first TEC drive current reading (i.e., $I_{TEC1}$) is obtained during the first optical power reading, while a second TEC drive current reading (i.e., $I_{TEC2}$) is obtained during the second optical power reading.

Recalling that optical power measurements are typically calculated by subtracting the initial (e.g., most recently measured) dark current (e.g., $I_{darkcurrent0}$) from the optical power reading (e.g., $I_{photodiode1}$), it is clear that if first optical power measurement is calculated without using the TEC drive current, that a large change in the current induced by Seebeck effect will significantly affect low optical power measurement stability.

$$I_{photodiode1} - I_{darkcurrent0} = I_{photocurrent1} + I_{Seebeck1} - I_{Seebeck0} \quad \text{Eq. 4}$$

In contrast, using the fact that the current induced by the Seebeck effect is related to the TEC drive current, a more accurate dark current correction is readily achieved. More specifically, using the predetermined relationship between TEC drive current and photodiode dark current provides a more accurate dark current correction, wherein the current variations induced by the Seebeck effect are also corrected for.

Figure 7:
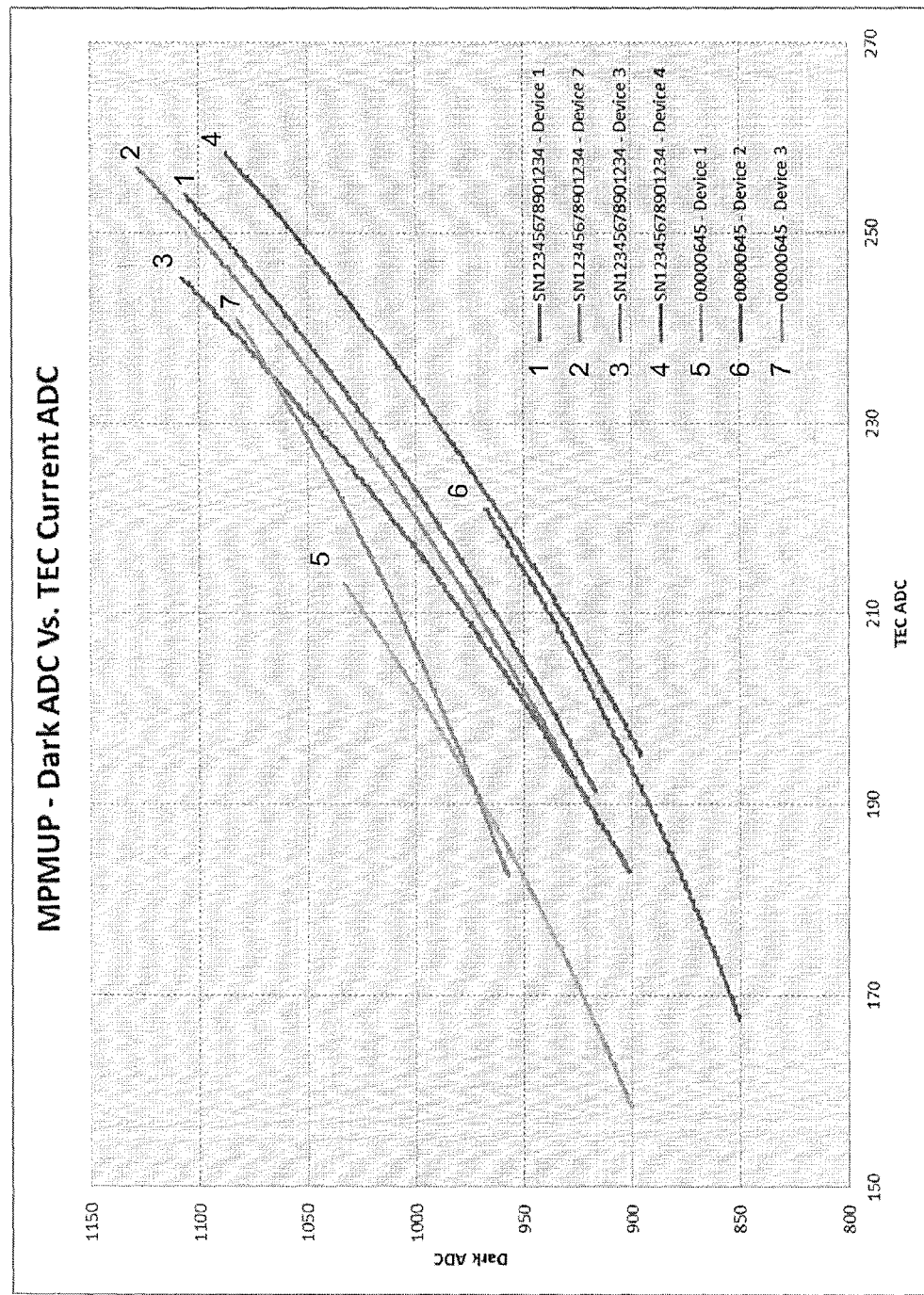
FIG. 7 shows a predetermined relationship between TEC drive current and dark current for a plurality of optical power meters.

Referring to FIG. 7, the relationship between TEC drive current and dark current is shown for various optical power meters. More specifically, FIG. 7 shows a plot of dark current ADC counts versus TEC drive current ADC counts for various optical power meters. In each case, a polynomial regression allows the relationship between TEC drive current and photodiode dark current to be modeled as an $n^{th}$ order polynomial. For example, in one embodiment the relationship between TEC drive current and dark current for a specific optical power meter is provided using the following $2^{nd}$ order curve $$\text{Dark\_Adc} = k_1 \text{TEC\_ADC}^2 + k_2 \text{TEC\_ADC} + k_3 \quad \text{Eq. 5}$$

wherein the coefficients $k_1=0.00677$, $k_2=-2.01222$, and $k_3=948.56$. In this case, Eq. 5 and the corresponding coefficients provide the predetermined relationship. As illustrated in FIG. 7, the curve, and thus equation and/or coefficients, often varies between individual optical power meters. Accordingly, the predetermined relationship often will be device specific and/or model specific. For example, if high precision is required, the coefficients will be measured for each optical power meter. If less precision is required, an average coefficient set is used for a certain model of an optical power meter.

Referring again to Eq. 5, it is clear that the first TEC drive current reading (i.e., $I_{TEC1}$), which is concurrently obtained with the first optical power reading ($I_{photodiode1}$), can be used with coefficients $k_1$, $k_2$, and $k_3$, to estimate the dark current (i.e., a corrected dark current) at the time the first optical power reading was measured. This corrected dark current is then subtracted from the optical power reading to provide a relatively accurate optical power measurement even for low power measurements.

Although the corrected dark current can be calculated directly from the TEC drive current using the predetermined relationship, in practice, improved accuracy, and thus stability, is achieved when measured differences in the TEC drive current are used with the predetermined relationship. In particular, accuracy is improved when the difference in measured TEC drive current from when the initial dark current was obtained (i.e., $I_{TEC0}$) and when the optical power reading was obtained (e.g., $I_{TEC1}$) is used with the predetermined relationship (e.g., input into Eq. 5) to find the difference in dark current (i.e., the dark current drift that has occurred since the initial dark current reading was obtained). This difference thus becomes the correction factor that is applied to the optical power reading (i.e., where the initial dark current has already been subtracted from the optical power reading), or that is used to correct the initial dark current reading, which is subsequently subtracted from the optical power reading.

Advantageously, the TEC drive current values (e.g., $I_{TEC1-n}$) used to calculate the correction factor typically are measured concurrently with the optical power readings, thus providing real-time dark current correction. Accordingly, dark current drift is no longer an issue, and optical power readings are improved by an order of magnitude.

In fact, using the TEC drive current to calculate the corrected dark current provides significantly improved optical power measurements relative to those wherein the dark current correction only uses the photodiode current values obtained in tandem measurements. For example, even in an optical power meter having a mechanical shutter or mechanical light chopper, which allows the optical power meter to interleave every optical power reading with a dark current reading, the tandem reading introduces challenges. In particular, even though the time span between tandem readings is relatively short (e.g., the dark current is read within a fraction of a second for every measurement), the resulting optical power meter is useless for monitoring short durations events in optical power that would be missed during the dark current cycle of the power meter. In addition, this solution comes at the expense of moving mechanical parts that are both expensive, and a reliability concern. In contrast, monitoring changes in dark current by monitoring the TEC drive current provides a solution that allows continuous and real-time dark current correction, and which is relatively cost effective to implement and operate.

Of course, the above embodiments and applications have been provided as examples only. It will be appreciated by those of ordinary skill in the art that various modifications, alternate configurations, and/or equivalents will be employed without departing from the spirit and scope of the invention. For example, in the above described embodiments, the photodiode, amplifiers, ADCs, and controller are illustrated as separate components. However, in some embodiments, some of these components will be integrated with other components. For example, in some embodiments the TEC cooled photodiode is an amplified photodiode and/or one or more of the ADCs are part of the controller. For example, in one embodiment, the ADC that is part of the current monitor (e.g., which typically requires lower resolution than ADC 230) is part of the controller. Accordingly, the scope of the invention is therefore intended to be limited solely by the scope of the appended claims.

What is claimed is:

1. A method of determining an optical power measurement using an optical power meter including a photodiode with a thermo-electric cooler (TEC) comprising:
    determining an initial dark current measurement of the photodiode, and an initial drive current of the TEC;
    measuring a power measurement of an optical beam;
    measuring a current drive current of the TEC; and
    calculating a corrected optical power measurement based on the initial dark current of the photodiode and on a difference between the initial drive current of the TEC and the current drive current of the TEC.

2. An apparatus comprising:
    a photodiode having a surface for receiving a beam of light, the photodiode to generate a current dependent upon an optical power of the beam of light;
    a thermo-electric cooler to maintain the photodiode at a predetermined temperature;
    a current monitor to measure a drive current passing through the thermo-electric cooler; and
    a controller to calculate the optical power of the beam of light, the controller including a non-transitory storage medium having instructions stored thereon to cause the controller to determine a correction factor based upon at least one current measured by the current monitor, wherein the optical power of the beam of light is dependent upon the correction factor, and
    wherein the instructions to cause the controller to determine the correction factor are to cause the controller to determine a difference between a second drive current reading of drive current passing through the thermo-electric cooler and a first drive current reading of drive current passing through the thermo-electric cooler, the first drive current reading obtained concurrently with a photodiode dark current reading and the second drive current reading obtained concurrently with a first optical power reading, each of the first and second drive current readings being measured with the current monitor.

3. The apparatus according to claim 2, wherein the non-transitory storage medium has stored thereon a predetermined relationship between drive current of the thermo-electric cooler and dark current of the photodiode, and wherein the instructions include instructions for calculating the correction factor using the predetermined relationship and the difference between the second and first drive current readings.

4. The apparatus according to claim 2, wherein the non-transitory storage medium has stored thereon a predetermined relationship between drive current of the thermo-electric cooler and dark current of the photodiode, and wherein the predetermined relationship is based on the instructions to cause the controller to determine the correction factor.

5. The apparatus according to claim 2, wherein the current monitor comprises a sense resistor, a linear amplifier, and an analog to digital converter.

6. The apparatus according to claim 2, comprising a linear amplifier for amplifying the current generated by the photodiode, and an analog-to-digital converter for digitizing the voltage output from the amplifier and providing a digital reading to a processor in the controller.

7. The apparatus according to claim 3, wherein the apparatus is an optical power meter.

8. The apparatus according to claim 2, wherein the apparatus is an optical power meter.

9. The apparatus according to claim 8, wherein the instructions include instructions for calculating a corrected optical power reading based on an initial dark current of the photodiode and for calculating a difference between an initial drive current and a current drive current passing through the thermo-electric cooler.

10. An optical power meter comprising:
a photodiode for measuring an optical power of a beam of light, the photodiode having an initial dark current;
a thermo-electric cooler (TEC) for maintaining the photodiode at a predetermined temperature, the TEC having an initial drive current;
a current meter for measuring a current drive current for the TEC; and
a controller for calculating a corrected optical power reading based on the initial dark current and a difference between the initial drive current and the current drive current,
wherein the controller includes a non-transitory storage medium having stored thereon a predetermined relationship between drive current of the thermo-electric cooler and dark current of the photodiode, and wherein the corrected optical power reading is based on the predetermined relationship.

11. The optical power meter according to claim 10, wherein the current meter comprises a sense resistor, a linear amplifier, and an analog to digital converter.

12. A method of determining an optical power of a beam of light with a photodiode cooled by a thermo-electric cooler, comprising:
measuring a dark current of the photodiode and a first drive current of the thermo-electric cooler;
measuring a current of the photodiode when the beam of light is incident thereon and measuring a second drive current of the thermo-electric cooler; and
calculating the optical power of the beam of light using the current of the photodiode and a correction factor, the correction factor using a predetermined relationship between drive current of the thermo-electric cooler and dark current of the photodiode.

13. The method according to claim 12, wherein the correction factor is determined using a difference between the first and second drive currents of the thermo-electric cooler.

14. The method according to claim 12, wherein the predetermined relationship is determined by fitting a curve to a plot of dark current of the photodiode versus drive current of the thermoelectric cooler.

15. The method according to claim 14, wherein the correction factor is calculated by applying coefficients of the curve to the difference between the first and second drive currents of the thermo-electric cooler.

16. The method according to claim 14, wherein calculating the optical power of the beam of light comprises subtracting the correction factor from the dark current of the photodiode to provide a corrected dark current, and subtracting the corrected dark current from the current of the photodiode.

* * * * *